UNITED STATES PATENT OFFICE.

CLAYTON W. BEDFORD, OF AKRON, OHIO, ASSIGNOR TO GOODYEAR TIRE & RUBBER COMPANY, OF AKRON, OHIO, A CORPORATION OF OHIO.

ART OF PREPARING CAOUTCHOUC SUBSTANCES AND VULCANIZATION PRODUCT THEREFROM.

1,323,951.    Specification of Letters Patent.    Patented Dec. 2, 1919.

No Drawing.    Application filed May 29, 1917. Serial No. 171,696.

*To all whom it may concern:*

Be it known that I, CLAYTON W. BEDFORD, a citizen of the United States, residing at Akron, in the county of Summit and State of Ohio, have invented a new and useful Improvement in the Art of Preparing Caoutchouc Substances and Vulcanization Product Therefrom, of which the following is a specification.

My invention relates to the art of preparing caoutchouc substances and the vulcanization product or products resulting therefrom.

The nature, objects and advantages of my invention, as well as the method of carrying out the same, will be fully understood from the following specification.

It is well known that the vulcanization of caoutchouc by sulfur is aided or accelerated by numerous organic nitrogen-containing bodies. Not all nitrogen compounds exhibit this property to any appreciable or technically useful degree. For example, the animal proteid known as glue or gelatin, if added to a rubber mixture, seems to act only as an inert filler and has little or no effect upon the rate of vulcanization.

I have discovered, however, that if this animal proteid be first hydrolyzed or otherwise decomposed, and the hydrolyzed or decomposed product be added to a rubber-sulfur mixture, the vulcanization is found to be materially affected and accelerated thereby. The desired hydrolysis or decomposition may be effected by the natural fermentation of a solution of the proteids exposed to the atmosphere at ordinary temperatures, for instance, about 75° F. As the result of the changes taking place under such conditions, the nitrogen is changed from an inactive to an active form, as regards its effects on vulcanization.

It is known that the hydrolysis of the proteid may be effected by means of water alone, or aqueous solutions of acids or alkalis, such treatment producing hydrolytic or other decomposition products of proteids. I have discovered that the hydrolysis or decomposition of proteids of the character referred to, by means of various chemicals, such as acetic acid, hydrochloric acid, nitric acid, caustic soda, sodium carbonate, calcium hydrate, phenol, ammonia, sodium zincate, etc., results in a hydrolyzed or decomposed product which by its effect on the vulcanization of caoutchouc evidences the presence of active nitrogen.

I have further discovered that, presumably because of the amphoteric properties of some of the decomposition products, it is preferable to have some basic group or element present to form a salt with the organic acids resulting from the decomposition of the proteid, in order that the basic nitrogen resulting from this same decomposition may be free to exert its greatest effect on the vulcanization of caoutchouc. Thus it is preferable to use calcium hydrate or other like base, rather than acids for the hydrolysis or decomposition of the proteids, or if acids be used, lime, caustic, or other basic substance should be later added to neutralize not only the acid employed in the process, but also the organic acids resulting from the process as mentioned above.

I have found that a further improvement may be effected by treating the proteid after hydrolysis and decomposition by alkilis, alkaline earths, etc., with carbon dioxid, there being reason for believing that the amido acids produced by the decomposition thus re-act to form carbamic acids (Zeit. Physiol. Chem. 1905, 45, 401-404). A simpler method of forming the carbamic acids, which seems to produce equally good or better results, is to effect the hydrolysis or decomposition of the proteid directly by means of alkaline carbonates. The proteid decomposition product as produced by the use of the carbonate, or by the carbon dioxid treatment, is stronger in its effect on the vulcanization than are the hydrolysis or decomposition products hitherto mentioned.

In general the replacement of increasing proportions of the rubber in a rubber sulfur mixture by various substitutes results in an increasing departure of the properties of the vulcanized products from the properties of the full rubber product. I have discovered, however, that the hydrolyzed or decomposition products of proteins, and especially those resulting from the decomposition by carbonates or from the carbon dioxid treatment mentioned, are capable of replacing rubber in a very high proportion, *i. e.*, up to from 20 to 30% without materially effecting the properties of the vulcanized product. In fact, up to 20% of the rubber may be replaced, and the vulcanized product will depart from the properties of the full rubber product rather in the direction of improved quality than otherwise. For example, replacement of 20% of the rubber in a rubber sulfur mixture by undecomposed protein, factis, resins, or other known substitutes results in a vulcanized product of perceptibly lower quality than the full rubber mixture; whereas, the replacement of 20% of the rubber by the protein for example, animal glue decomposed with an aqueous solution of $Na_2CO_3$ results in a vulcanized product equal or higher in quality than the full rubber mixture. The protein decomposition product referred to may suitably be prepared by mixing 70 pounds of glue with sufficient water to form a thin solution when hot, adding about 10 lbs. of soda ash thereto, boiling and concentrating until the water content is about 16%. As hereinafter stated, the water-containing jelly thus produced is mixed with the rubber, which is subsequently vacuum or air dried prior to vulcanization. Although I have described the replacement of 20% of the rubber of a mixture by the hydrolyzed protein as a suitable proportion, I may use it to the extent of from 5 to 30% of the weight of the rubber.

As to the method of employing my new compounding ingredient, accelerator, filler, or substitute, it should be noted that the addition of the dried and ground decomposition product to the rubber sulfur mixture gives inferior results, in that the vulcanized product is granular and non-homogeneous. Even though the grinding be carried out with great care and the ground product sifted to obtain as fine a separation as is practical, this difficulty is not wholly overcome, the vulcanized rubber still showing, upon careful examination, the presence of the substituted material. These disadvantageous results may be completely avoided, however, if the protein decomposition product is first mixed with sufficient water to form a paste or jelly, this paste then being incorporated into the rubber and the water removed previous to vulcanization by vacuum or air drying, or any other accepted method. By such treatment, a perfectly homogeneous mixture is secured, and upon vulcanization a product of high quality and free from the characteristics of adulterated or filled products is obtained.

While I have described in considerable detail a preferred method of obtaining the advantages of my invention, together with the chemical theories upon which I believe the invention to be based, it will be understood that such description is only for the purpose of rendering more clear the nature of the invention and the principles governing the method of employing the same, and that my invention is not to be regarded as limited to the details of procedure, or the proportions above mentioned, except in so far as such limitations are included within the terms of the accompaanying claims, in which it is my intention to claim all the novelty inherent in my invention as broadly as is permissible in view of the prior art.

What I claim is new, and desire to secure by Letters Patent, is:

1. The process of producing vulcanized rubber, which comprises incorporating into rubber a product of hydrolytic decomposition of a proteid and heating the resultant mixture with a vulcanizing agent to effect vulcanization.

2. The process of producing vulcanized rubber, which comprises incorporating into rubber the products resulting from the decomposition of a proteid by means of an aqueous solution of an alkaline reagent.

3. The process of producing vulcanized rubber, which comprises incorporating into rubber the products resulting from the decomposition of a proteid by means of an aqueous solution of an alkaline carbonate.

4. The process of producing vulcanized rubber, which comprises incorporating into rubber the products resulting from the decomposition of a proteid by means of an aqueous solution of a sodium carbonate.

5. The process of producing vulcanized rubber which comprises treating an amphoteric body containing basic nitrogen with a metallic base, whereby the acid end of said body becomes a metallic salt, incorporating the body thus treated and containing active nitrogen into rubber, and heating the resultant mixture with a vulcanizing agent to effect vulcanization.

6. The process of producing vulcanized rubber, which comprises incorporating into rubber a wetted mixture of the decomposition products of a proteid, drying the mixture, and heating the resultant product with a vulcanizing agent to effect vulcanization.

7. In the process according to claim 6, carrying out the proteid decomposition by an aqueous solution of an alkaline reagent.

8. In the process according to claim 6, carrying out the proteid decomposition by an aqueous solution of an alkaline carbonate.

9. In the process according to claim 6, carrying out the proteid decomposition by an aqueous solution of a sodium carbonate.

10. The process of producing vulcanized rubber which comprises incorporating into rubber a wetted mixture of the reaction product of an amphoteric body containing basic nitrogen and a metallic base, whereby the acid end of said body becomes a metallic salt, drying the mixture, and heating the resultant product with a vulcanizing agent to effect vulcanization.

11. A vulcanized rubber product formed by vulcanizing rubber and a product of hydrolytic decomposition of a proteid.

12. A vulcanized rubber product formed by vulcanizing rubber and a product of hydrolytic decomposition produced by the action of an alkaline reagent on a proteid.

13. A vulcanized rubber product formed by vulcanizing rubber, and a decomposition product produced by the action of an alkaline carbonate on a proteid.

14. A vulcanized rubber product formed by vulcanizing rubber, and a decomposition product produced by the action of a sodium carbonate in aqueous solution on a proteid.

15. A vulcanized rubber product produced by vulcanizing a mixture of rubber and an amphoteric body containing basic nitrogen, said body being treated with a metallic base in such a manner that the acid end of such body becomes a metallic salt prior to the incorporation of the body into the rubber.

16. The process of producing vulcanized rubber which comprises treating an amphoteric body containing basic nitrogen with a metallic carbonate, whereby a carbamate is formed, incorporating the body thus obtained and containing active nitrogen into rubber, and heating the resultant mixture with a vulcanizing agent to effect vulcanization.

17. The process of producing vulcanized rubber which comprises treating an amphoteric body containing basic nitrogen simultaneously with a metallic base and carbon dioxid incorporating the carbamate containing active nitrogen thus obtained into rubber, and heating the resultant mixture with a vulcanizing agent to effect vulcanization.

18. The process of producing vulcanized rubber which comprises treating an amphoteric body containing basic nitrogen with a metallic carbonate, whereby a carbamate is formed, incorporating the body thus obtained in an aqueous vehicle into rubber and heating the resultant mixture with a vulcanizing agent to effect vulcanization.

19. The process of producing vulcanized rubber which comprises treating an amphoteric body containing basic nitrogen simultaneously with a metallic base and carbon dioxid incorporating the carbamate thus obtained in an aqueous vehicle into rubber and heating the resultant mixture with a vulcanizing agent to effect vulcanization.

20. A vulcanized rubber product produced by vulcanizing a mixture of rubber and an amphoteric body containing basic nitrogen, said body being treated with a metallic carbonate prior to its incorporation into the rubber.

CLAYTON W. BEDFORD.